US011321498B2

(12) United States Patent
Jones

(10) Patent No.: US 11,321,498 B2
(45) Date of Patent: May 3, 2022

(54) TECHNIQUES FOR TRANSFORMING ARBITRARY DESIGNS INTO MANUFACTURABLE DESIGNS BY REMOVING FORBIDDEN PATTERNS

(71) Applicant: X Development LLC, Mountain View, CA (US)

(72) Inventor: Albin Lee Jones, Half Moon Bay, CA (US)

(73) Assignee: X Development LLC, Mountain View, CA (US)

( * ) Notice: Subject to any disclaimer, the term of this patent is extended or adjusted under 35 U.S.C. 154(b) by 133 days.

(21) Appl. No.: 16/805,299

(22) Filed: Feb. 28, 2020

(65) Prior Publication Data

US 2021/0271782 A1  Sep. 2, 2021

(51) Int. Cl.
*G06F 30/10* (2020.01)
*G06F 119/18* (2020.01)
*G03F 1/36* (2012.01)

(52) U.S. Cl.
CPC .............. *G06F 30/10* (2020.01); *G03F 1/36* (2013.01); *G06F 2119/18* (2020.01)

(58) Field of Classification Search
CPC ......... G06F 30/10; G06F 2119/18; G03F 1/36
See application file for complete search history.

(56) References Cited

U.S. PATENT DOCUMENTS 8,219,941 B2 * 7/2012 Sinha .................. G03F 1/36
716/51
8,510,699 B1 * 8/2013 Acar .................. G06F 30/39
716/119
8,566,754 B2 * 10/2013 Kwang ............... G06F 30/398
716/52
8,732,625 B2 * 5/2014 Ye .......................... G06F 30/20
716/50

(Continued)

OTHER PUBLICATIONS

Meyer, D., et al. "Enforcement of Mask Rule Compliance in Model-Based OPC'ed Layouts During Data Preparation" Proc. SPIE 4889, 22nd Annual BACUS Symposium on Photomask Technology (2002) (Year: 2002).*
Mukherjee, M., et al. "Optical Rule Checking for Proximity-Corrected Mask Shapes" Proc. SPIE 5040, Optical Microlithography XVI (2003) (Year: 2003).*
Ma, X., et al. "Block-based mask optimization for optical lithography" Applied Optics, vol. 52, No. 14, pp. 3351-3363 (2013) (Year: 2013).*

(Continued)

*Primary Examiner* — Jay Hann
(74) *Attorney, Agent, or Firm* — Christensen O'Connor Johnson Kindness PLLC

(57) ABSTRACT

In some embodiments, a method of ensuring fabricability of a segmented design for a physical device to be fabricated by a fabrication system is provided. A proposed segmented design is searched for forbidden patterns in a set of forbidden patterns. Segments from the proposed segmented design that appear in forbidden patterns are added to a set of unfabricable segments. A material indicated by at least one unfabricable segment from the set of unfabricable segments is changed to create an updated segmented design, and the updated segmented design is searched for the forbidden patterns in the set of forbidden patterns. In response to determining that the updated segmented design includes at (Continued)

least one forbidden pattern, the adding, changing, and searching actions are repeated. In response to determining that the updated segmented design does not include any forbidden patterns, an indication is generated that the updated segmented design is fabricable.

18 Claims, 10 Drawing Sheets

(56) References Cited

U.S. PATENT DOCUMENTS

| | | | | |
|---|---|---|---|---|
| 8,782,582 | B1* | 7/2014 | Gupta | G06F 30/398 |
| | | | | 716/106 |
| 9,395,622 | B2* | 7/2016 | Inoue | G03F 1/36 |
| 9,594,867 | B2* | 3/2017 | Yu | G06F 30/398 |
| 11,036,126 | B2* | 6/2021 | Lin | G06F 30/398 |
| 2021/0191360 | A1* | 6/2021 | Jones | G06F 30/20 |

OTHER PUBLICATIONS

Ding, D., et al. "High Performance Lithography Hotspot Detection with Successively Refined Pattern Identifications and Machine Learning" IEEE Transactions on Computer-Aided Design of Integrated Circuits & Systems, vol. 30, No. 11, pp. 1621-1634 (2011) (Year: 2011).*

Peralta, I., et al., "Optimization-based design of heat flux manipulation devices with emphasis on fabricability," Scientific Reports, 7:6261, Jul. 24, 2017, pp. 1-8.

Hammond, A.M., "Machine Learning Methods for Nanophotonic Design, Simulation, and Operation," BYU ScholarsArchive, https://scholarsarchive.byu.edu/etd/7131, Apr. 1, 2019, 64 pp.

Vercruysse, D., et al., "Analytical level set fabrication constraints for inverse design," Scientific Reports, 9:8999, Jun. 21, 2019, pp. 1-7.

Su, L., et al., "Nanophotonic Inverse Design with SPINS: Software Architecture and Practical Considerations," arXiv:1910.04829v2 [physics.app-ph] Oct. 31, 2019, pp. 1-26.

* cited by examiner

TECHNIQUES FOR TRANSFORMING ARBITRARY DESIGNS INTO MANUFACTURABLE DESIGNS BY REMOVING FORBIDDEN PATTERNS

TECHNICAL FIELD

This disclosure relates generally to designing devices, and in particular but not exclusively, relates to verifying fabricability of device designs.

BACKGROUND INFORMATION

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Inverse design techniques allow a designer to specify a small number of design parameters (such as a desired performance of a physical device such as an optical or electromagnetic device), and the inverse design techniques generate highly performant designs that achieve the desired performance. However, these techniques often generate designs that may be highly performant but are incapable of being fabricated. A need exists for techniques for ensuring the fabricability of device designs.

SUMMARY

In some embodiments, a method of ensuring fabricability of a segmented design for a physical device to be fabricated by a fabrication system is provided. A proposed segmented design is received, wherein each segment of the proposed segmented design indicates a material within the segment. The proposed segmented design is searched for forbidden patterns in a set of forbidden patterns. Segments from the proposed segmented design that appear in forbidden patterns are added to a set of unfabricable segments. The material indicated by at least one unfabricable segment from the set of unfabricable segments is changed to create an updated segmented design. The updated segmented design is searched for the forbidden patterns in the set of forbidden patterns. In response to determining that the updated segmented design includes at least one forbidden pattern, the adding, changing, and searching actions are repeated. In response to determining that the updated segmented design does not include any forbidden patterns, an indication is generated that the updated segmented design is fabricable.

In some embodiments, a non-transitory computer-readable medium is provided. The medium has logic stored thereon that, in response to execution by one or more processors of a computing system, cause the computing system to perform actions for ensuring fabricability of a segmented design for a physical device to be fabricated by a fabrication system. A proposed segmented design is received, wherein each segment of the proposed segmented design indicates a material within the segment. The proposed segmented design is searched for forbidden patterns in a set of forbidden patterns. Segments from the proposed segmented design that appear in forbidden patterns are added to a set of unfabricable segments. The material indicated by at least one unfabricable segment from the set of unfabricable segments is changed to create an updated segmented design. The updated segmented design is searched for the forbidden patterns in the set of forbidden patterns. In response to determining that the updated segmented design includes at least one forbidden pattern, the adding, changing, and searching actions are repeated. In response to determining that the updated segmented design does not include any forbidden patterns, an indication is generated that the updated segmented design is fabricable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Embodiments of a system, apparatus, and method for ensuring fabricability of a segmented design are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
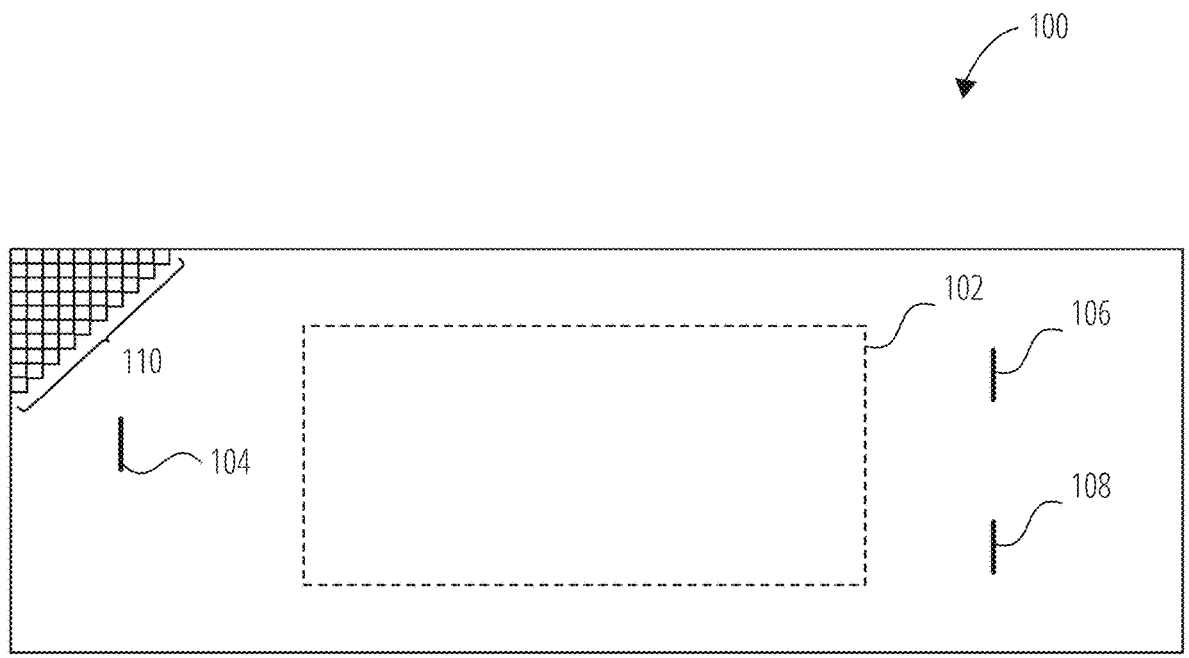
FIG. 1 illustrates an example rendering of a non-limiting example of a simulated environment describing an electromagnetic device according to various aspects of the present disclosure.
Figure 2:
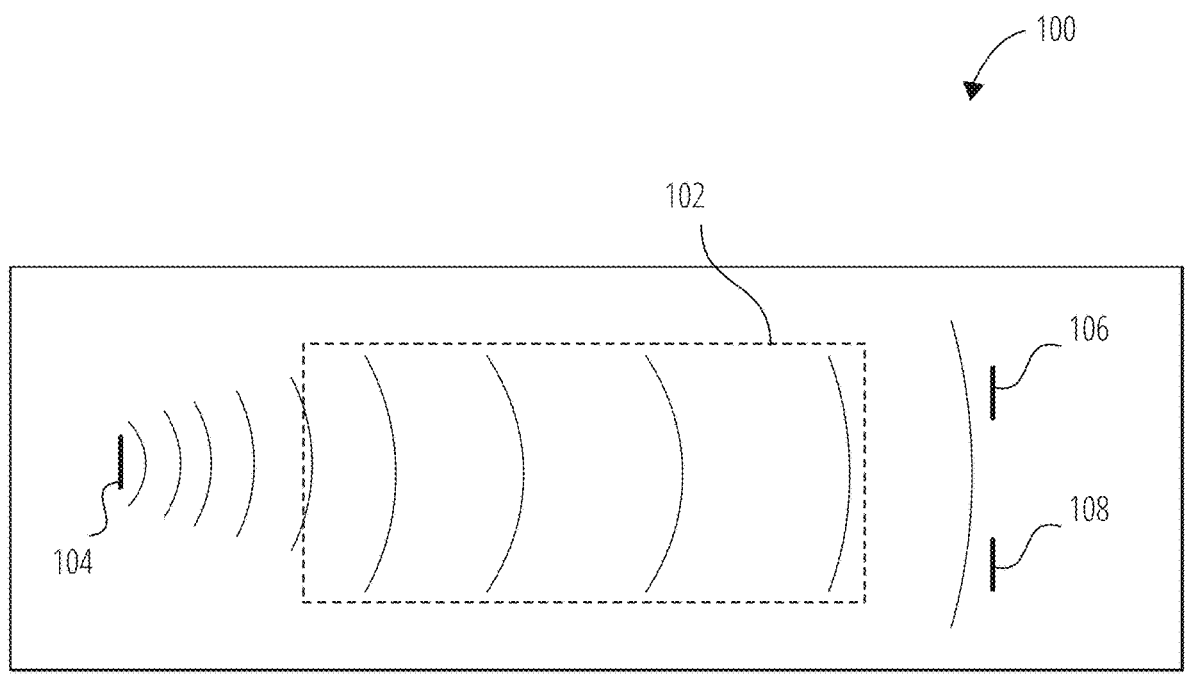
FIG. 2 illustrates a non-limiting example embodiment of a time-forward simulation of the simulated environment describing the electromagnetic device, according to various aspects of the present disclosure.

FIG. 1 and FIG. 2 illustrate an initial set up and a time-forward simulation of a simulated environment for optimizing structural parameters of an electromagnetic device according to various aspects of the present disclosure.

In the following embodiments, the simulated environment 100 will be described in the context of an optical waveguide as corresponding to the electromagnetic device. However, it is appreciated that the electromagnetic device is not limited to optical waveguides, and that other electromagnetic devices such as lasers, lenses, transistors, optical devices, quantum-dynamic devices, antennas, optoelectronic switches, mechanical structures, and the like may be represented by the term "electromagnetic device." Likewise, though an electromagnetic device is an example of a type of device for which the fabricability of a proposed segmented design may be ensured using embodiments of the present disclosure, embodiments of the present disclosure are not limited to working with designs for an electromagnetic device. Instead, embodiments of the present disclosure may be used to ensure the fabricability of a proposed segmented design for any type of physical device.

A segmented design, as used herein, is a design that is defined by a configuration of a plurality of segments. In some embodiments, the segmented design may be a two-dimensional design, wherein the segments are squares arranged in a two-dimensional grid pattern. In some embodiments, the segmented design may be a three-dimensional design, wherein the segments are cubes arranged in a three-dimensional grid pattern. These embodiments are non-limiting examples only, and in other embodiments, the segments may be any other shape, and/or may be laid out in any other pattern. In some embodiments, the segments of a given segmented design may be of heterogenous shapes and/or sizes. In the discussion herein, "segments" may also be referred to as "pixels" or "voxels" for two-dimensional segments and three-dimensional segments, respectively.

The simulated environment 100 and corresponding initial set up and time-forward simulation may be achieved via a physics simulator. As illustrated in FIG. 1 and FIG. 2, the simulated environment 100 is represented in two-dimensions. However, it is appreciated that higher (e.g., 3-dimensional space) and lower (e.g., 1-dimensional space) dimensionality may also be used to describe the simulated environment 100 and electromagnetic device.

FIG. 1 illustrates an example rendering of a non-limiting example of a simulated environment 100 describing an electromagnetic device according to various aspects of the present disclosure. The simulated environment 100 represents the simulated environment 100 at an initial time step (e.g., an initial set up) for optimizing structural parameters of the electromagnetic device. The electromagnetic device described by the simulated environment 100 may correspond to an optical waveguide having a designable region 102 in which the structural parameters of the simulated environment may be designed, modified, or otherwise changed. The simulated environment 100 includes an excitation source 104 (e.g., a gaussian pulse, a wave, a waveguide mode response, and the like). The electrical and magnetic fields within the simulated environment 100 (and subsequently the electromagnetic device) may change (e.g., field response) in response to the excitation source 104. The electromagnetic device includes a first waveguide output port 106 and a second waveguide output port 108, which may be used for determining a performance parameter or metric of the electromagnetic device in response to the excitation source 104.

As illustrated, the simulated environment 100 (and subsequently the electromagnetic device) is described by a plurality of segments 110, which represent individual elements of the two-dimensional (or three-dimensional) space of the simulated environment. Each of the segments 110 is illustrated in FIG. 1 as two-dimensional squares, however it is appreciated that the segments 110 may be represented as cubes or other shapes in three-dimensional space, or shapes other than squares in a two-dimensional environment. It is appreciated that the specific shape and dimensionality of the plurality of segments 110 may be adjusted dependent on the simulated environment 100. It is further noted that only a portion of the plurality of segments 110 are illustrated to avoid obscuring other aspects of the simulated environment 100.

For simulation purposes, each of the plurality of segments 110 may be associated with at least a structural value to describe the structural parameters, a field value to describe a field response, and a source value to describe the excitation source at a specific position within the simulated environment 100. The field response, for example, may correspond to a vector describing the electric and/or magnetic field at a particular time step for each of the plurality of segments 110. More specifically, the vector may correspond to a Yee lattice to discretize Maxwell's equations for determining the field response. In some embodiments, the field response is based, at least in part, on the structural parameters and the excitation source 104. For design purposes, each of the plurality of segments 110 may be associated with the presence or absence of a material. The material may be deposited or removed during manufacture using a photolithography system, an additive manufacturing system, or any other suitable type of fabrication system.

FIG. 2 illustrates a non-limiting example embodiment of a time-forward simulation of the simulated environment 100 describing the electromagnetic device, according to various aspects of the present disclosure. The rendered simulated environment 100 represents the time-forward simulation at a particular time step in which the excitation source 104 is active (e.g., generating waves originating at the excitation source 104 that propagate through the simulated environment 100). In some embodiments, the electromagnetic device is an optical waveguide operating at a frequency of interest and having a particular waveguide mode (e.g., transverse electromagnetic mode, transverse electric mode, etc.) and the excitation source is at an input of the optical waveguide having a specified spatial, phase, and temporal profile. The time-forward simulation occurs over a plurality of time steps, including the illustrated time step. When performing the time-forward simulation, changes to the field response (e.g., the field value) for each of the plurality of segments 110 are updated in response to the excitation source 104 and based, at least in part, on the structural parameters of the electromagnetic device at each of the plurality of time steps. Similarly, in some embodiments the source value is updated for each of the plurality of segments 110 (e.g., in response to the electromagnetic waves from the excitation source 104 propagating through the simulated environment 100). It is appreciated that the time-forward simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the time-forward simulation, decomposition components from the field response associated with a performance parameter of the electromagnetic device are extracted. In some embodiments, the performance parameter corresponds to the amount of a desired output mode of the first waveguide output port 106 and the second waveguide output port 108. Extracting the decomposition components may correspond to extracting Fourier components of the performance parameter as a function of time. The performance parameter represents power (at one or more frequencies of interest) in the desired mode shape at the specific locations of the first waveguide output port 106 and the second waveguide output port 108. A loss value may subsequently be computed based, at least in part, on a difference between the performance parameter at a time step (e.g. a final time step of the time-forward simulation) and a desired performance value. The loss value may be determined by a loss function which describes the relationship between the performance parameter and the desired performance value. In some embodiments, backpropagation may also be performed in the simulated environment 100, and the time-forward simulation and the backpropagation may be used to improve the performance of the simulated environment 100 by suggesting changes in a design in the designable region 102.

Figure 3:
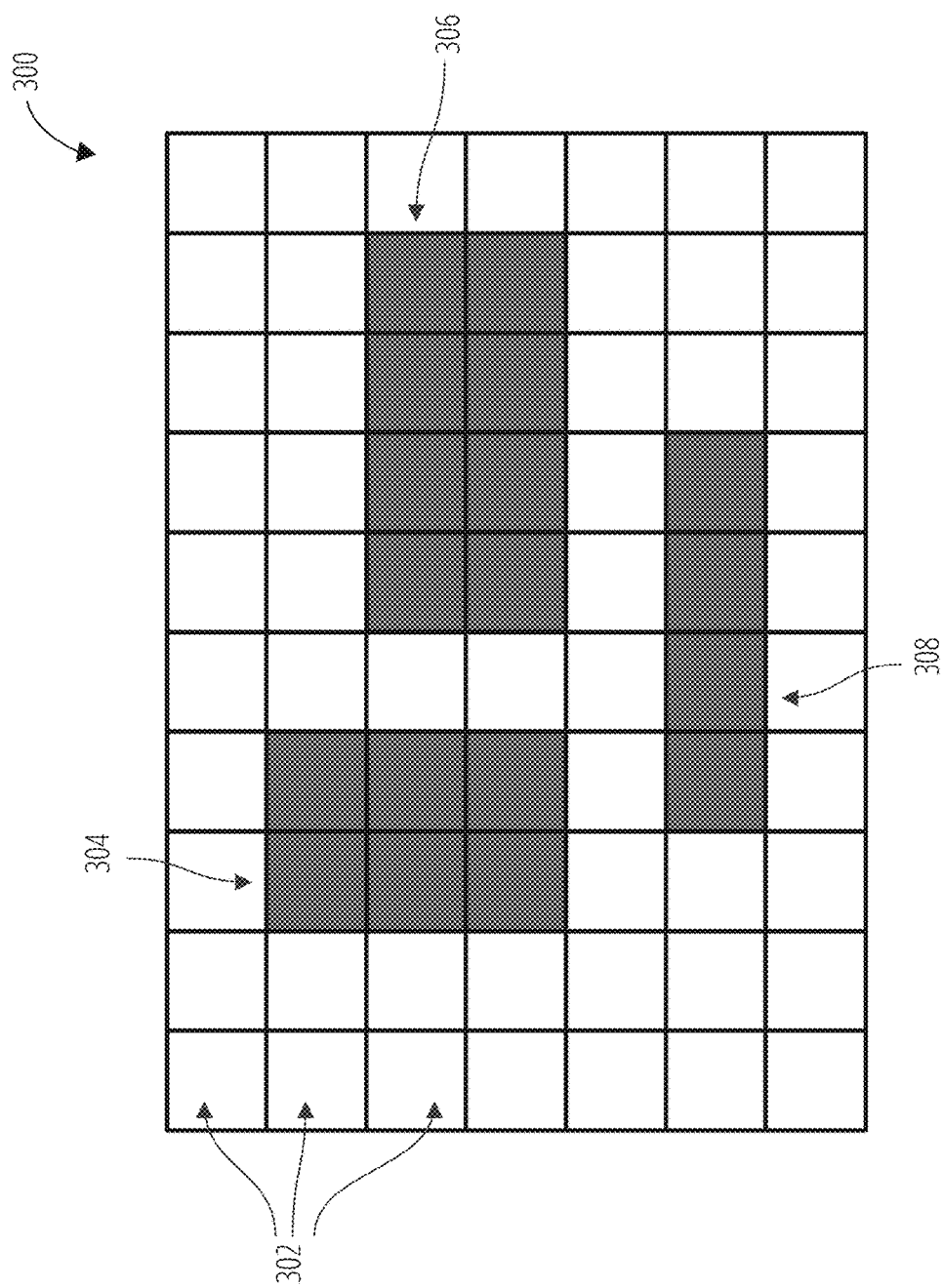
FIG. 3 is a schematic drawing that illustrates a non-limiting example embodiment of a segmented design according to various aspects of the present disclosure.

FIG. 3 is a schematic drawing that illustrates a non-limiting example embodiment of a segmented design according to various aspects of the present disclosure. The segmented design 300 is a non-limiting example of content suitable for insertion in the designable region 102 described above (though not drawn to the scale or with the same granularity of segmentation). As shown, the segmented design 300 includes a plurality of segments 302 laid out in a two-dimensional grid. Each of the segments 302 represents a location in the proposed segmented design that can either include a material or not include a material. As illustrated, segments that are white indicate a lack of the material, and segments that are dark (such as the first pattern 304, the second pattern 306, and the third pattern 308, indicate a presence of the material. For example, in a photolithography process, segments that are white may represent locations that are not exposed, and segments that are dark may represent locations that are exposed during the photolithography process. As another example, in an additive manufacturing process (e.g., a 3-D printer), segments that are white may represent locations that do not include material, and segments that are dark may represent locations that do include material. As yet another example, segments that are white may represent a first material, and segments that are dark may represent a second material.

This description is a non-limiting example only, and in some embodiments, the white and dark segments may have another meaning within the segmented design 300. In some embodiments, the segmented design 300 may include more than two colors. For example, a white segment may indicate a lack of material, a segment in a first color may indicate presence of a first material, and a segment in a second color may indicate a presence of a second material. In some embodiments, the segmented design 300 may be three-dimensional or one-dimensional, instead of the two-dimensional segmented design 300 illustrated in FIG. 3.

Typically, a fabrication system can duplicate any segmented design provided to it, subject to certain constraints. For example, a minimum feature size, a minimum feature shape, or any other constraint may be specified by the fabrication system as limitations on the segmented designs that the fabrication system can fabricate. From these constraints, a "paintbrush pattern" can be determined. In some embodiments, the paintbrush pattern represents a smallest feature that can be generated by a given fabrication system. If a given segmented design can be created by tiling the paintbrush pattern over the segmented design, then the segmented design is fabricable using the associated fabrication system. If one or more portions of the segmented design cannot be drawn with the paintbrush pattern, then the segmented design is not fabricable using the associated fabrication system. In some embodiments, if a fabrication system can fabricate devices with more than one material, separate constraints (and therefore separate paintbrush patterns) may be provided for each different material.

Figure 4:
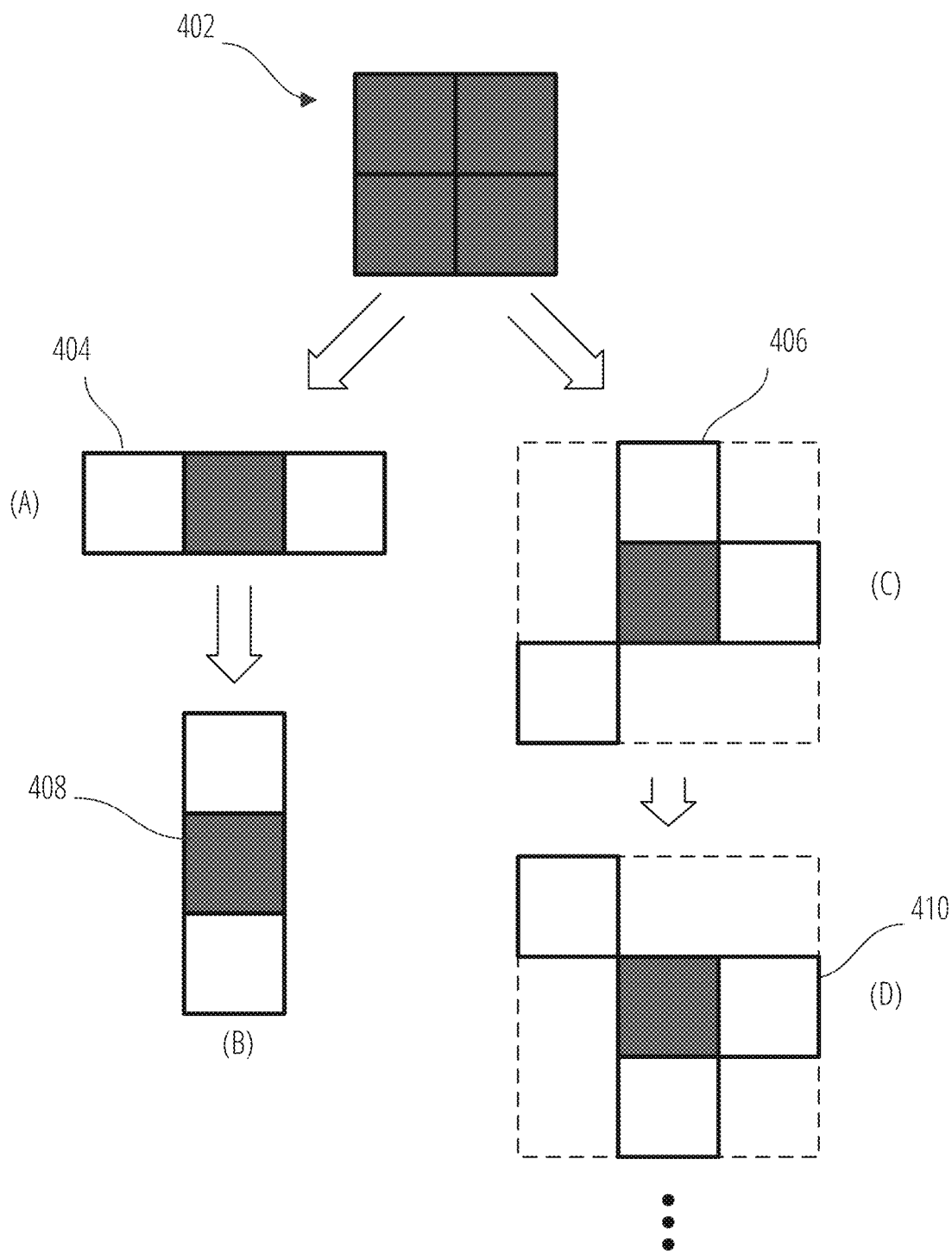
FIG. 4 is a schematic drawing that illustrates a non-limiting example embodiment of a paintbrush pattern and forbidden patterns according to various aspects of the present disclosure.

FIG. 4 is a schematic drawing that illustrates a non-limiting example embodiment of a paintbrush pattern and forbidden patterns according to various aspects of the present disclosure. As shown, the paintbrush pattern 402 is a representation of constraints provided by a given fabrication system in which the minimum feature size is two segments by two segments, arranged in a square shape.

In order to determine fabricability of a given segmented design, the paintbrush pattern 402 could be drawn over the segmented design in order to determine if each pattern can be drawn using the paintbrush pattern 402. In FIG. 3, the first pattern 304 and the second pattern 306 can be drawn by the paintbrush pattern 402, because they are both at least two segments wide or tall. The third pattern 308, however, is only one segment tall, and therefore cannot be drawn by the paintbrush pattern 402. Accordingly, the segmented design 300 of FIG. 3 is not fabricable using the fabrication system represented by the paintbrush pattern 402.

One way to perform the paintbrush analysis described above is to consider each of the first pattern 304, the second pattern 306, and the third pattern 308, and to determine whether a tiling of the paintbrush pattern 402 within each pattern is possible. Unfortunately, such a calculation tends to be intractable, particularly as the size of the segmented design 300 and/or the number of patterns to be drawn increases. The search for paintbrush patterns in the patterns of a segmented design can be replaced by a search for forbidden patterns, which are patterns that are not possible to create with a given paintbrush pattern.

Returning to FIG. 4, a first forbidden pattern 404 and a second forbidden pattern 406 based on the paintbrush pattern 402 are illustrated. Logically, the first forbidden pattern 404 is based on the idea that a two-by-two paintbrush pattern such as paintbrush pattern 402 can never paint a single segment surrounded on opposite sides by unpainted segments, because the paintbrush pattern 402 is too wide. The second forbidden pattern 406 is based on the idea that, if a given segment is painted and a segment above and a segment to the right of the painted segment are unpainted, then a segment below and to the left of the painted segment cannot also be unpainted because the paintbrush pattern 402 would not fit between the unpainted segments. In the second forbidden pattern 406, the content of the dashed portions in the upper right corner, the upper left corner, and the lower right corner (e.g., the painted or unpainted state of those segments) are irrelevant, and so are illustrated in dashed lines.

Each forbidden pattern may be rotated and/or flipped in order to cover all possible permutations of the forbidden patterns. As shown, the first forbidden pattern 404 is rotated to create a third forbidden pattern 408. The first forbidden pattern 404 and the third forbidden pattern 408 together cover all permutations of the first forbidden pattern 404. The second forbidden pattern 406 is rotated 90 degrees to create a fourth forbidden pattern 410. Though omitted for the sake of brevity, the second forbidden pattern 406 may be rotated 180 degrees and 270 degrees to create forbidden patterns.

In some embodiments, forbidden patterns may be provided based directly on design constraints of a fabrication system, instead of by first determining a paintbrush pattern. For example, if a design constraint indicates that two dark shapes (regardless of size or shape) may not touch at a corner, then "checkerboard" forbidden patterns (i.e., a 2×2 forbidden pattern that includes dark segments in the upper-left and lower-right positions, and white segments in the upper-right and lower-left positions, along with a rotated version of such a pattern) may be used without a corresponding paintbrush pattern.

The segmented design 300 can be searched for the forbidden patterns in order to determine whether the segmented design 300 is fabricable. Similar to the determination above, it would be found that segmented design 300 is not fabricable, at least because the third pattern 308 includes the third forbidden pattern 408, the second forbidden pattern 406, and several transformed versions of the second forbidden pattern 406 (including but not limited to fourth forbidden pattern 410).

Though forbidden patterns can be used to determine whether a given segmented design is or is not fabricable, it is still desired to convert an unfabricable segmented design to a fabricable segmented design in an efficient manner. One example of a technique that may be used to transform unfabricable segmented designs into fabricable segmented designs is to change dark segments to white segments (or vice versa) until no forbidden patterns are found.

Figure 5:
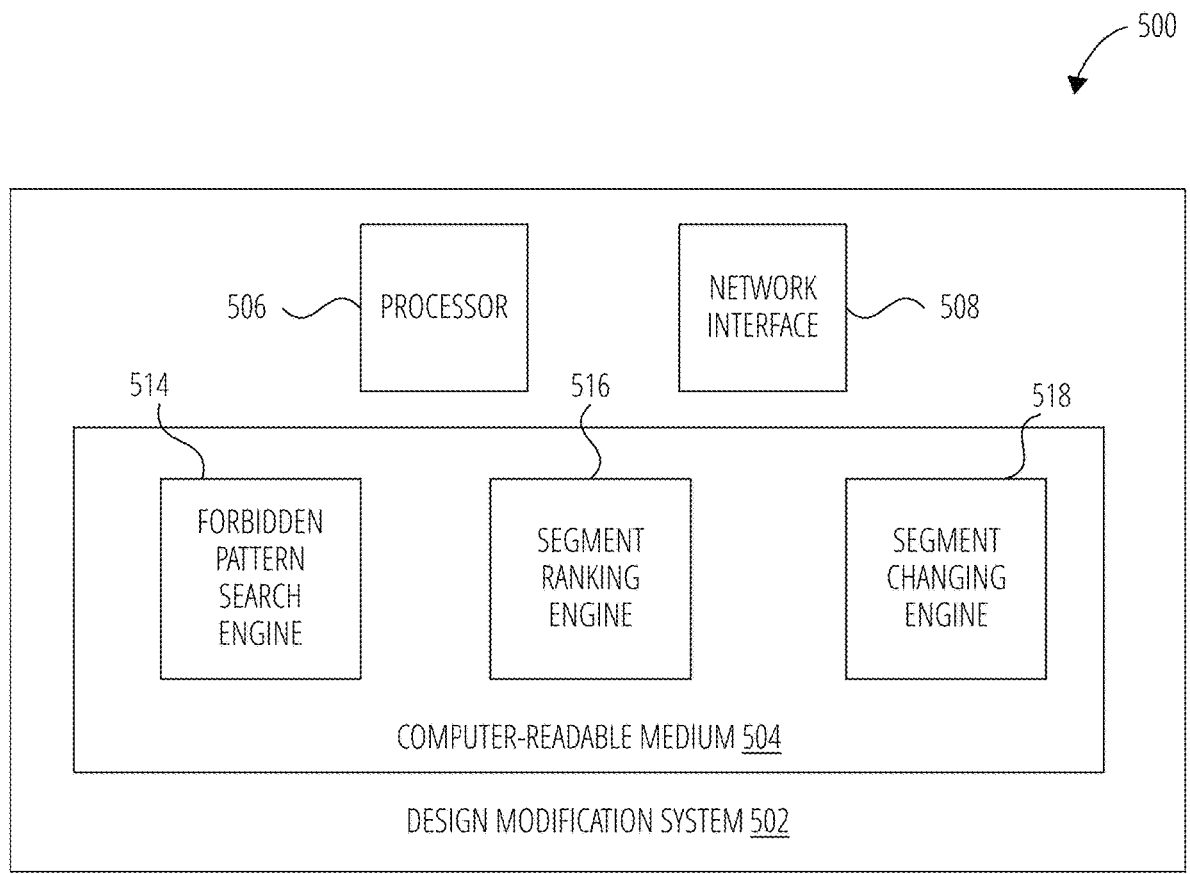
FIG. 5 is a block diagram that illustrates a non-limiting example embodiment of a system for ensuring fabricability of a segmented design according to various aspects of the present disclosure.
Figure 5:
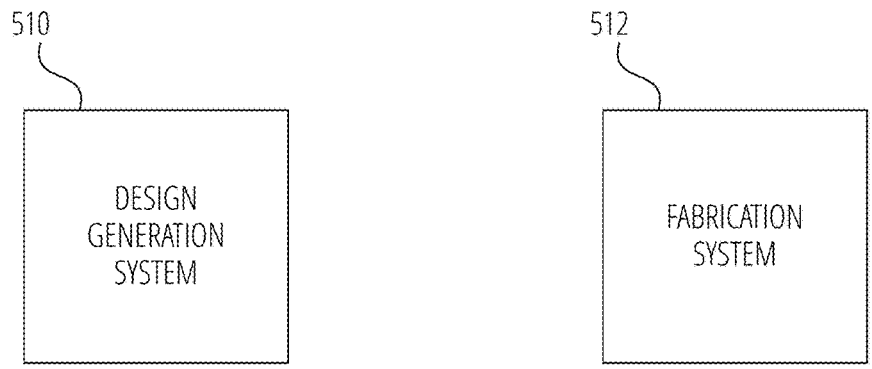

FIG. 5 is a block diagram that illustrates a non-limiting example embodiment of a system for ensuring fabricability of a segmented design according to various aspects of the present disclosure. The system 500 includes a design generation system 510, a design modification system 502, and a fabrication system 512. Communication between the design generation system 510, the design modification system 502, and the fabrication system 512 may occur via a network (not pictured), via exchange of a removable computer-readable medium (not pictured), or via any other suitable technique.

In some embodiments, the design generation system 510 may include one or more computing devices that are configured to generate segmented designs that achieve a desired result. For example, the design generation system 510 may use forward simulation and backpropagation techniques to generate a segmented design for an electromagnetic device that has desired characteristics. This is a non-limiting example only, and any other technique, including but not limited to manual design, may be used by the design generation system 510 to create proposed segmented designs.

In some embodiments, the fabrication system 512 may be any suitable system for fabricating a segmented design. In some embodiments, the fabrication system 512 may be a photolithography system or an additive manufacturing system. In some embodiments, the fabrication system 512 may have characteristics that include a minimum feature size, a minimum feature shape, and/or other characteristics that help define the segmented designs that the fabrication system 512 is capable of fabricating.

In some embodiments, the design modification system 502 may be any suitable computing device or collection of computing devices configured to provide the functionality described below. In some embodiments, the design modification system 502 may be a server computing device, a desktop computing device, a laptop computing device, a mobile computing device, a tablet computing device, or one or more computing devices of a cloud computing system.

As shown, the design modification system 502 includes at least one processor 506, a network interface 508, and a computer-readable medium 504. In some embodiments, the at least one processor 506 may include a plurality of processors and/or a plurality of processing cores in order to provide a large amount of computing power. In some embodiments, the network interface 508 may be configured to communicate with the design generation system 510 and/or the fabrication system 512 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 508, the design modification system 502 may be configured to communicate with the design generation system 510 and/or the fabrication system 512 via transfer of a removable computer-readable medium (not shown).

As shown, the computer-readable medium 504 has logic stored thereon for providing a forbidden pattern search engine 514, a segment ranking engine 516, and a segment changing engine 518. In some embodiments, the forbidden pattern search engine 514 is configured to search for the forbidden patterns in at least one set of forbidden patterns within a proposed segmented design generated by the design generation system 510. In some embodiments, the segment ranking engine 516 is configured to determine which segments in the proposed segmented design are present in the most forbidden patterns. In some embodiments, the segment changing engine 518 is configured to choose one or more segments to be changed, based on the rankings provided by the segment ranking engine 516, in order to move the proposed segmented design closer to fabricability. Further description of the actions which these components are configured to perform is provided below.

As used herein, the term "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As used herein, the term "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

Figure 6:
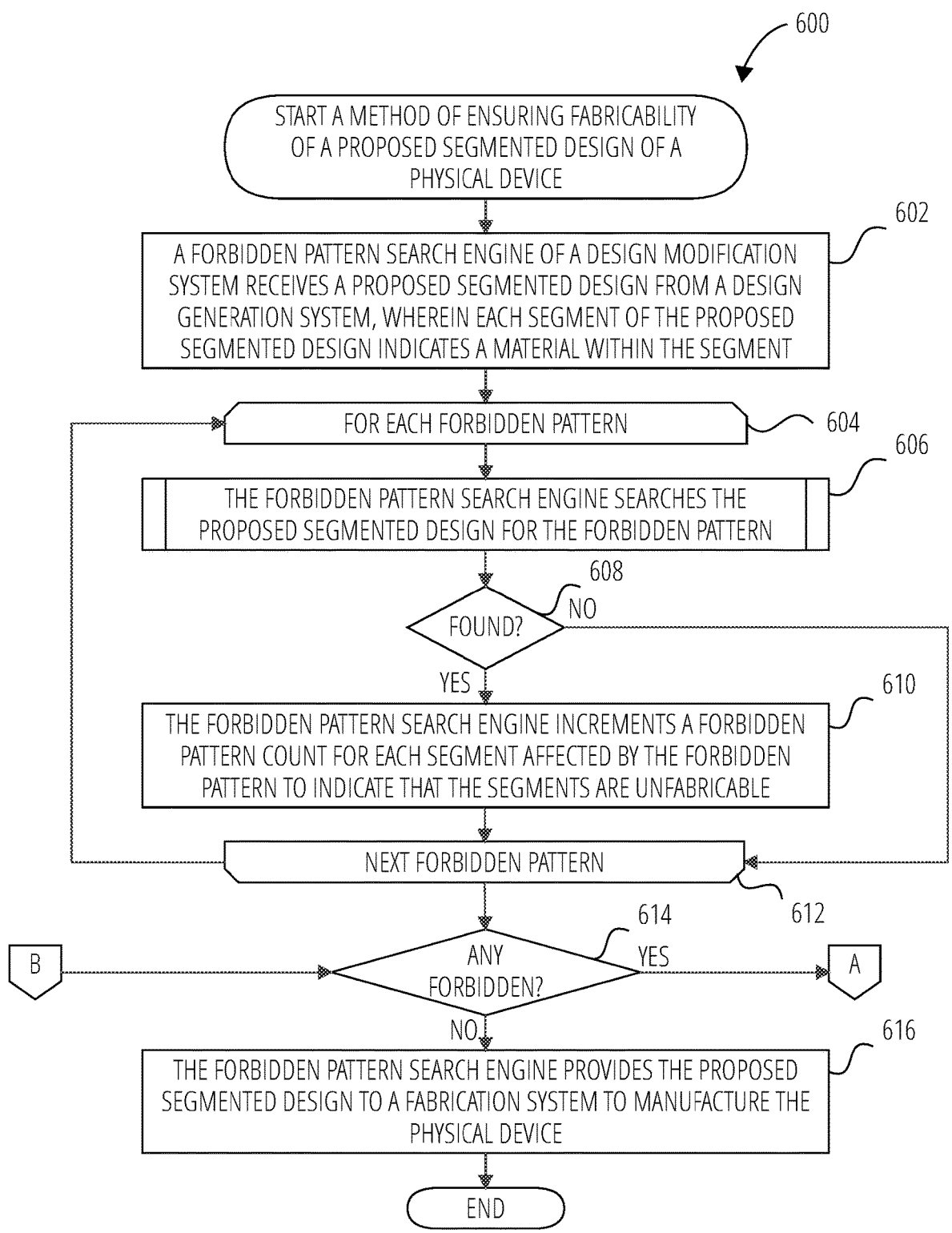
FIG. 6-FIG. 7 are a flowchart that illustrates a non-limiting example embodiment of a method of ensuring fabricability of a proposed segmented design of a physical device according to various aspects of the present disclosure.
Figure 7:
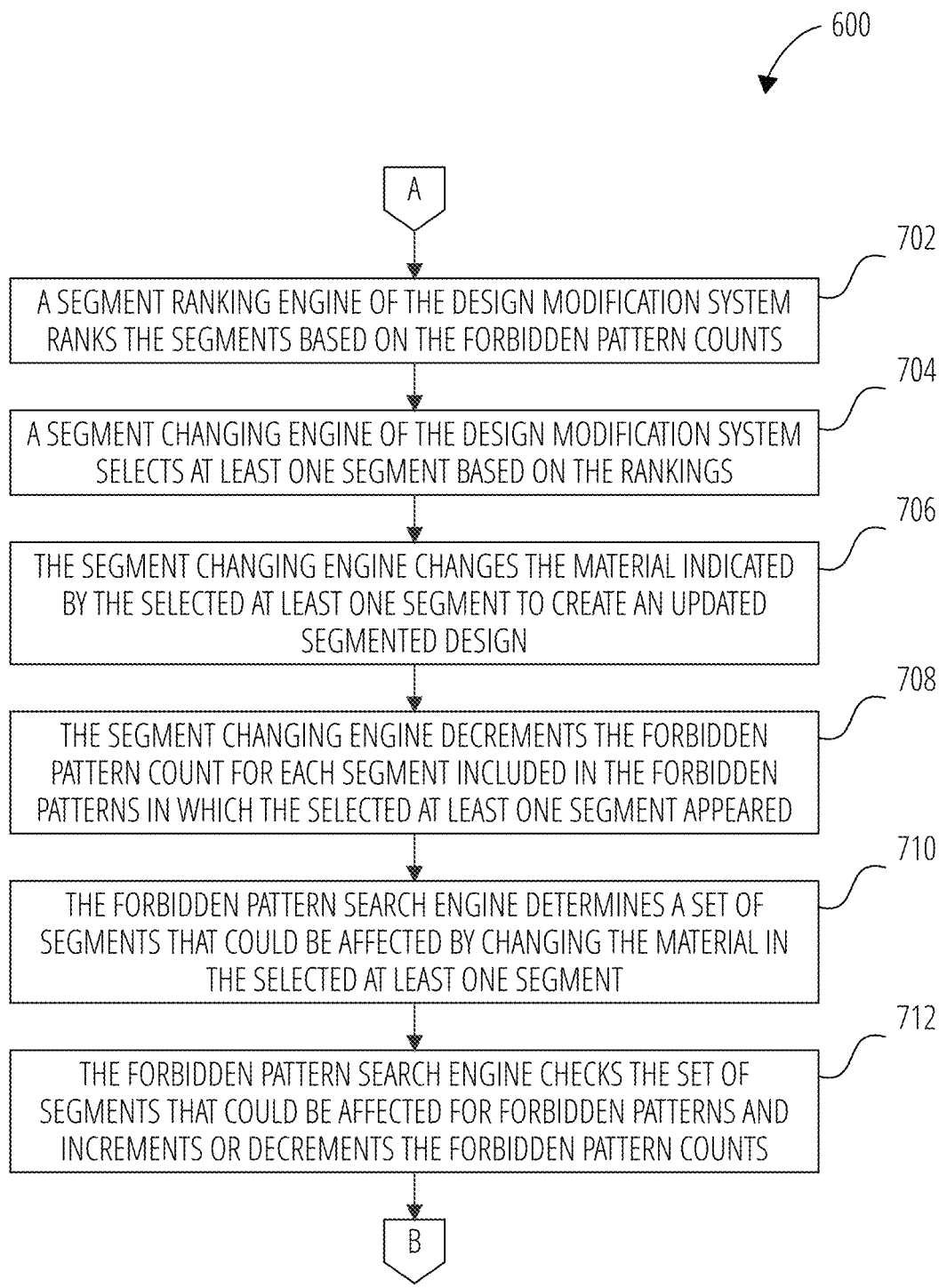

FIG. 6-FIG. 7 are a flowchart that illustrates a non-limiting example embodiment of a method of ensuring fabricability of a proposed segmented design of a physical device according to various aspects of the present disclosure. In the method 600, forbidden patterns are searched for in a proposed segmented design. Segments are ranked based on how many forbidden patterns they belong to, in order to find the "worst" segments with regard to fabricability. The rankings may then be used to choose one or more segments to change to a different material (e.g., change a white segment to a dark segment, or vice versa), until the segmented design becomes fabricable by virtue of all of the forbidden patterns being removed.

From a start block, the method 600 proceeds to block 602, where a forbidden pattern search engine 514 of a design modification system 502 receives a proposed segmented design from a design generation system 510, wherein each segment of the proposed segmented design indicates a material within the segment. As discussed above, the indication of material could indicate a given material or a lack of the given material, could indicate a first material or a second material, or could indicate any other relevant structural parameter.

Figure 8:
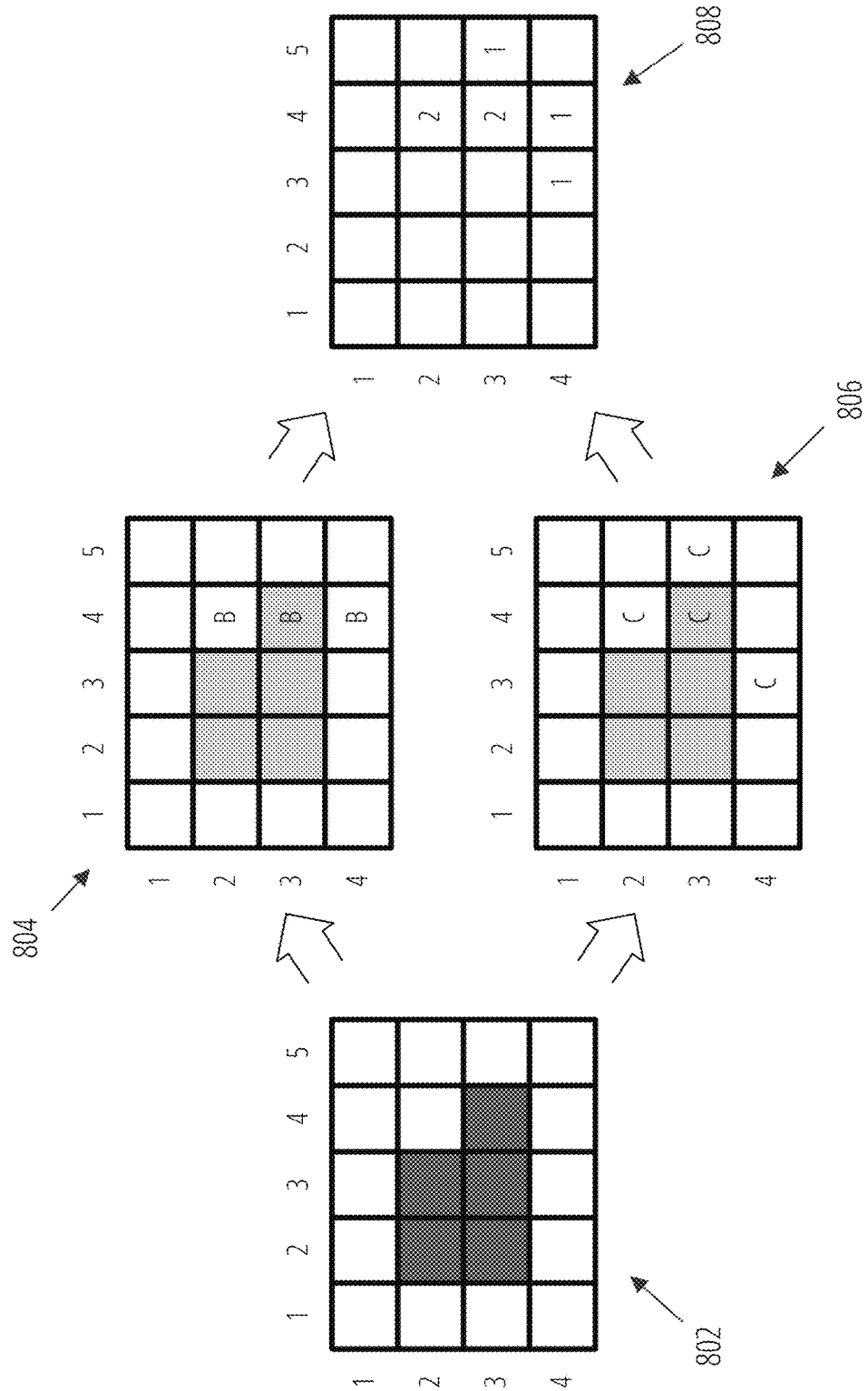
FIG. 8 is a schematic drawing that illustrates a non-limiting example embodiment of various aspects of the processing of the method of FIG. 6-FIG. 7.

FIG. 8 is a schematic drawing that illustrates a non-limiting example embodiment of various aspects of the processing of the method 600. In FIG. 8, a proposed segmented design 802 is provided. The proposed segmented design 802 includes a set of rows labeled 1 through 4, and a set of columns labeled 1 through 5. For purposes of illustration, the proposed segmented design 802 will be analyzed with respect to the forbidden patterns for a 2×2 paintbrush pattern 402 as illustrated in FIG. 4. To recap, these forbidden patterns are a first forbidden pattern 404 (labeled as (A)), a second forbidden pattern 406 (labeled as (B)), a third forbidden pattern 408 (labeled as (C)), and a fourth forbidden pattern 410 (labeled as (D)). Other forbidden patterns may also be used, but for the sake of brevity and clarity in this discussion, only these four forbidden patterns will be discussed.

Returning to FIG. 6, the method 600 proceeds to a for-loop defined between a for-loop start block 604 and a for-loop end block 612, wherein each forbidden pattern of a set of forbidden patterns associated with the fabrication system 512 is used to process the proposed segmented design.

From the for-loop start block 604, the method 600 advances to subroutine block 606, where the forbidden pattern search engine 514 searches the proposed segmented design for the forbidden pattern. Any suitable technique may be used to search for the forbidden pattern in the proposed segmented design. For example, in some embodiments, a cross-correlation between the proposed segmented design and the forbidden pattern may be calculated. As another example, in some embodiments, a more efficient search technique such as a discrete Fourier transform or a number theoretic transform may be used to search for the forbidden pattern.

At decision block 608, a determination is made regarding whether the forbidden pattern was found in the proposed segmented design. If the forbidden pattern was found, then the result of decision block 608 is YES, and the method 600 advances to block 610. Otherwise, the result of decision block 608 is NO, and the method 600 advances to for-loop end block 612. At block 610, the forbidden pattern search engine 514 increments a forbidden pattern count for each segment affected by the forbidden pattern to indicate that the segments are unfabricable. In some embodiments, incrementing the forbidden pattern count for a segment may constitute adding the segment to a set of unfabricable segments, where it will remain until the forbidden pattern count returns to zero.

Subroutine block 606, decision block 608, and block 610 are illustrated as separate blocks for ease of discussion only. In some embodiments, a single step may both search for the forbidden pattern and increment the forbidden pattern count for segments in which it is found.

At for-loop end block 612, a determination is made regarding whether further forbidden patterns remain to be processed. If so, the method 600 returns to for-loop start block 604 to process the next forbidden pattern. If no forbidden patterns remain to be processed, then the method 600 advances to decision block 614.

FIG. 8 includes an illustration of the results of searching the proposed segmented design 802 for the forbidden patterns illustrated in FIG. 4. The first forbidden pattern 404 and the fourth forbidden pattern 410 are not found in the proposed segmented design 802, and so are not illustrated. A first search result 804 shows the result of searching for the second forbidden pattern 406: the second forbidden pattern 406 is found in segments [2, 4], [3, 4], and [4,4], and so those segments are indicated in first search result 804 with a "B". A second search result 806 shows the result of searching for the third forbidden pattern 408: the third forbidden pattern 408 is found in segments [2, 4], [3, 4], [3, 5], and [4,3], and so those segments are indicated in second search result 806 with a "C". Once a forbidden pattern is found in a segment, a forbidden pattern count for that segment is incremented. Accordingly, FIG. 8 shows forbidden pattern counts 808 that result from these searches. Segments [2, 4] and [3,4] appear in two forbidden patterns, and so have a count of 2. Segments [3, 5], [4, 3], and [4, 4] each appear in one forbidden pattern, and so have a count of 1. In some embodiments, separate forbidden pattern counts may be maintained for each forbidden pattern. In some embodiments, a total forbidden pattern count may be maintained in addition to the separate forbidden pattern counts.

Returning to FIG. 6, at decision block 614, a determination is made regarding whether any forbidden patterns were found in the proposed segmented design. In some embodiments, the forbidden pattern search engine 514 may simply determine whether any of the forbidden pattern counts are non-zero to determine whether any forbidden patterns were found. If any forbidden patterns were found, then the result of decision block 614 is YES, and the method 600 advances to a continuation terminal ("terminal A").

Figure 9:
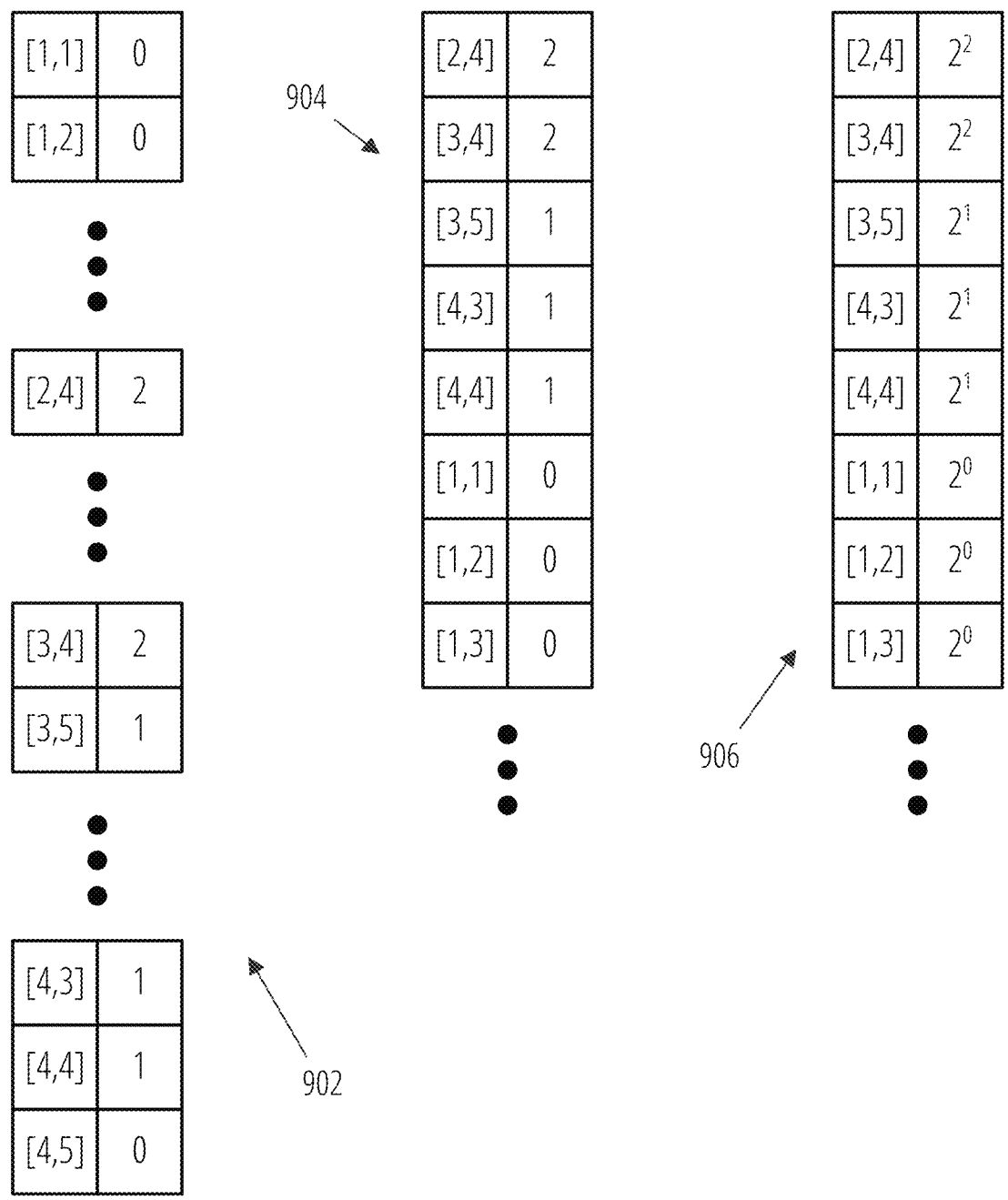
FIG. 9 is a schematic drawing that illustrates a non-limiting example embodiment of further aspects of the processing of the method of FIG. 6-FIG. 7.

From terminal A (FIG. 7), the method 600 advances to block 702, where a segment ranking engine 516 of the design modification system 502 ranks the segments based on the forbidden pattern counts. Any suitable technique for ranking the segments based on the forbidden pattern may be used. For example, the forbidden pattern counts may be stored in a list, array, or other data structure that can then be sorted according to the forbidden pattern counts to rank the segments. FIG. 9 illustrates one non-limiting example embodiment of an unsorted array 902 that stores each of the forbidden pattern counts from forbidden pattern counts 808, and a non-limiting example embodiment of a sorted array of forbidden pattern counts 904 sorted by the forbidden pattern counts. In some embodiments, other data structures, such as a skip list, may be used to store and/or sort this information.

At block 704, a segment changing engine 518 of the design modification system 502 selects at least one segment based on the rankings, and at block 706, the segment changing engine 518 changes the material indicated by the selected at least one segment to create an updated segmented design. Any suitable technique may be used to select the at least one segment to be changed based on the rankings. For example, in some embodiments, one or more of the segments having the highest ranking (e.g., that have the highest forbidden pattern counts) may be selected. Using such a technique to change the "worst" segment (or segments) may be effective in altering the proposed segmented design in such a way that it becomes closer to being fabricable by eventually removing all of the forbidden patterns. In some embodiments, the selection of the one or more segments may be performed completely randomly (e.g., without using the rankings), though such embodiments would take a very long time to converge to a fabricable state, and may make more changes to the proposed segmented design than would be made with other techniques.

While naïve techniques such as these may be effective in some embodiments, in other embodiments they may have drawbacks. For example, always choosing the segment with the highest forbidden pattern count may result in cycles wherein the same sets of segments get changed on subsequent loops of the method 600, and the design may never converge to a fabricable state. Accordingly, in some embodiments, a certain amount of randomness may be incorporated into the selection of the segment to be changed based on the rankings in order to avoid cycles. For example, in some embodiments, a set of a predetermined number of highly ranked segments may be determined (e.g., the top ten highest ranked segments, or some other number of the highest ranked segments), and a random selection may be made from the set of highly ranked segments to choose the segment(s) to be changed. As another example, a weighted random selection may be made from either the set of the predetermined number of highly ranked segments, or from all of the segments, such that segments that are more highly ranked or that have higher forbidden pattern counts are more likely to be chosen by the random selection. In some embodiments, a weight may be calculated based on the forbidden pattern count for each segment, and the weight may be used for the random selection. FIG. 9 illustrates an example of a sorted array of weights 906 calculated for the segments for the forbidden pattern counts 808. In the sorted array of weights 906, a weight has been calculated for each segment based on raising a constant (in this case, 2) to the power of the forbidden pattern count for each segment. Using such a weight, it becomes more likely that a random selection will choose one of the segments with the highest forbidden pattern count, but retains enough randomness to avoid becoming stuck in a cycle. One will recognize that, when "random" selections are discussed herein, any type of random or pseudo-random selection technique may be used, including but not limited to using a pseudo-random number generator to generate a selection index.

The forbidden pattern counts 808 illustrated in FIG. 8 show how performing a weighted random selection can cause a proposed segmented design to quickly converge to a fabricable design. If either one of the segments with the highest forbidden pattern counts (segment [2,4] and segment [3,4]) are changed, then the segmented design can be drawn by the 2×2 paintbrush pattern 402, and is therefore fabricable. Changing other segments could also eventually converge to other fabricable designs (for example, if segment [4,4] is changed, and then, on a subsequent loop, segment [4,3] is changed), but in this example, choosing one of the highest ranked segments led to the fastest convergence.

At block 708, the segment changing engine 518 decrements the forbidden pattern count for each segment included in the forbidden patterns in which the selected at least one segment appeared. For example, with reference to FIG. 8, if segment [2,4] was changed from white to dark, the forbidden pattern count for segment [2,4] would be decremented, the other segments in the second forbidden pattern 406 (segments [3,4] and [4,4]) would be decremented, and the other segments in the third forbidden pattern 408 (segments [3,4], [3,5], and [4,3]) would be decremented. As another example, if segment [4,3] was changed from white to dark, the forbidden pattern count for segment [4,3] would be decremented, and the other segments in the third forbidden pattern 408 (segments [2,4], [3,4], and [3,5]) would also be decremented. Segment [4,4] would not be decremented, because segment [4,3] is not in a forbidden pattern with segment [4,4]. In some embodiments, the separate scores for each forbidden pattern may be decremented separately. In some embodiments, the combined forbidden pattern counts (as shown in forbidden pattern counts 808) may be decremented. In some embodiments, both the separate scores and the combined scores may be decremented.

At block 710, the forbidden pattern search engine 514 determines a set of segments that could be affected by changing the material in the selected at least one segment. The set of segments that could be affected may be determined using any suitable technique. In some embodiments, the size of the largest forbidden pattern may be used to determine an affected area, and all segments within the affected area may be processed. At block 712, the forbidden pattern search engine 514 checks the set of segments that could be affected for forbidden patterns and increments or decrements the forbidden pattern counts. In some embodiments, a similar technique to those used for the original search described in the for-loop defined between for-loop start block 604 and for-loop end block 612 may be used. In some embodiments, a simpler technique, such as a brute force technique, may be used to recheck these segments, because the set of segments that could be affected should be much smaller than the entire segmented design. The method 600 then returns to decision block 614 to check again whether any forbidden patterns are present. After returning to decision block 614, the updated segmented design is used as the proposed segmented design for the next iteration.

Returning to decision block 614 (FIG. 6), if no forbidden patterns were found, then the result of decision block 614 is NO, and the method 600 proceeds to block 616. At block 616, the forbidden pattern search engine 514 provides the proposed segmented design to a fabrication system 512 to manufacture the physical device. In some embodiments, the actions at block 616 may include generating an indication that the proposed segmented design is fabricable before providing the design for manufacture, and/or may include storing the proposed segmented design with the indication that the proposed segmented design is fabricable. The method 600 then proceeds to an end block and terminates.

Figure 10:
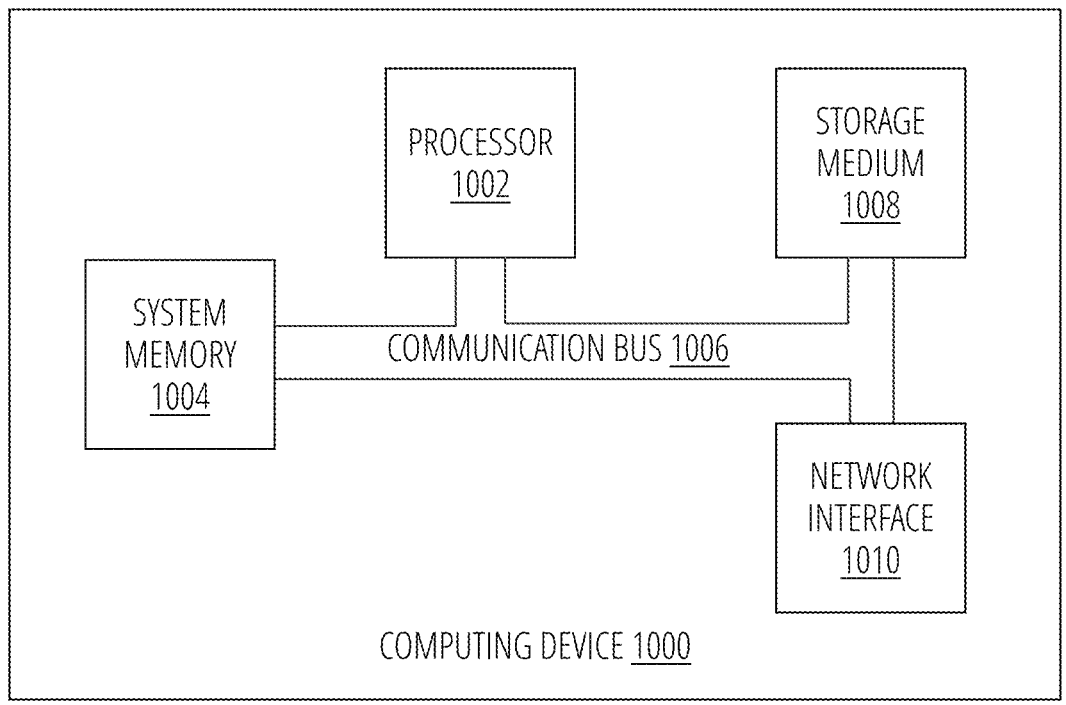
FIG. 10 is a block diagram that illustrates a non-limiting example embodiment of a computing device appropriate for use as a computing device with embodiments of the present disclosure.

FIG. 10 is a block diagram that illustrates aspects of an exemplary computing device 1000 appropriate for use as a computing device of the present disclosure. While multiple different types of computing devices were discussed above, the exemplary computing device 1000 describes various elements that are common to many different types of computing devices. While FIG. 10 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1000 may be any one of any number of currently available or yet to be developed devices.

In its most basic configuration, the computing device 1000 includes at least one processor 1002 and a system memory 1004 connected by a communication bus 1006. Depending on the exact configuration and type of device, the system memory 1004 may be volatile or nonvolatile memory, such as read only memory ("ROM"), random access memory ("RAM"), EEPROM, flash memory, or similar memory technology. Those of ordinary skill in the art and others will recognize that system memory 1004 typically stores data and/or program modules that are immediately accessible to and/or currently being operated on by the processor 1002. In this regard, the processor 1002 may serve as a computational center of the computing device 1000 by supporting the execution of instructions.

As further illustrated in FIG. 10, the computing device 1000 may include a network interface 1010 comprising one or more components for communicating with other devices over a network. Embodiments of the present disclosure may access basic services that utilize the network interface 1010 to perform communications using common network protocols. The network interface 1010 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 1010 illustrated in FIG. 10 may represent one or more wireless interfaces or physical communication interfaces described and illustrated above with respect to particular components of the computing device 1000.

In the exemplary embodiment depicted in FIG. 10, the computing device 1000 also includes a storage medium 1008. However, services may be accessed using a computing device that does not include means for persisting data to a local storage medium. Therefore, the storage medium 1008 depicted in FIG. 10 is represented with a dashed line to indicate that the storage medium 1008 is optional. In any event, the storage medium 1008 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1004 and storage medium 1008 depicted in FIG. 10 are merely examples of computer-readable media.

Suitable implementations of computing devices that include a processor 1002, system memory 1004, communication bus 1006, storage medium 1008, and network interface 1010 are known and commercially available. For ease of illustration and because it is not important for an understanding of the claimed subject matter, FIG. 10 does not show some of the typical components of many computing devices. In this regard, the computing device 1000 may include input devices, such as a keyboard, keypad, mouse, microphone, touch input device, touch screen, tablet, and/or the like. Such input devices may be coupled to the computing device 1000 by wired or wireless connections including RF, infrared, serial, parallel, Bluetooth, Bluetooth low energy, USB, or other suitable connections protocols using wireless or physical connections. Similarly, the computing device 1000 may also include output devices such as a display, speakers, printer, etc. Since these devices are well known in the art, they are not illustrated or described further herein.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of ensuring fabricability of a segmented design for a physical device to be fabricated by a fabrication system, the method comprising:

receiving a proposed segmented design, wherein each segment of the proposed segmented design includes a value that indicates a presence or an absence of a material within the segment;

searching the proposed segmented design for forbidden patterns in a set of forbidden patterns;

adding segments from the proposed segmented design that appear in forbidden patterns to a set of unfabricable segments;

selecting at least one unfabricable segment from the set of unfabricable segments, including randomly selecting at least one first unfabricable segment from the set of unfabricable segments;

changing the value of the selected at least one unfabricable segment to its opposite value to create an updated segmented design;

searching the updated segmented design for the forbidden patterns in the set of forbidden patterns;

in response to determining that the updated segmented design includes at least one forbidden pattern, repeating the adding, selecting, changing, and searching actions; and in response to determining that the updated segmented design does not include any forbidden patterns, generating an indication that the updated segmented design is fabricable.

2. The method of claim 1, wherein adding the segments from the proposed segmented design that appear in the forbidden patterns to the set of unfabricable segments includes, upon finding a given forbidden pattern in the proposed segmented design:

incrementing a forbidden pattern count for each segment associated with the given forbidden pattern.

3. The method of claim 2, wherein selecting the at least one unfabricable segment from the set of unfabricable segments includes:

selecting at least one second unfabricable segment from the set of unfabricable segments based on the forbidden pattern counts.

4. The method of claim 3, wherein selecting the at least one second unfabricable segment from the set of unfabricable segments based on the forbidden pattern counts includes selecting at least one unfabricable segment having a highest forbidden pattern count.

5. The method of claim 2, wherein randomly selecting the at least one first unfabricable segment from the set of unfabricable segments based on the forbidden pattern counts includes performing a weighted random selection, wherein the weights are based on the forbidden pattern counts.

6. The method of claim 5, wherein the weights are a constant raised to a power indicated by the forbidden pattern counts.

7. The method of claim 2, further comprising, for a given forbidden pattern in which the selected at least one unfabricable segment was found, decrementing the forbidden pattern count associated with the given forbidden pattern for each segment in the given forbidden pattern.

8. The method of claim 2, wherein searching the updated segmented design includes:

checking a set of segments that could be part of a forbidden pattern that includes the selected at least one unfabricable segment without checking segments that could not be part of a forbidden pattern that includes the selected at least one unfabricable segment; and incrementing or decrementing the forbidden pattern counts for the set of segments based on whether the segments in the set of segments appear in any forbidden patterns of the set of forbidden patterns after changing the value in the selected at least one unfabricable segment.

9. The method of claim 1, wherein generating the indication that the updated segmented design is fabricable includes providing the segmented design to the fabrication system to manufacture the physical device.

10. A non-transitory computer-readable medium having logic stored thereon that, in response to execution by one or more processors of a computing system, cause the computing system to perform actions comprising:

receiving a proposed segmented design, wherein each segment of the proposed segmented design includes a value that indicates a presence or an absence of a material within the segment;

searching the proposed segmented design for forbidden patterns in a set of forbidden patterns;

adding segments from the proposed segmented design that appear in forbidden patterns to a set of unfabricable segments;

selecting at least one unfabricable segment from the set of unfabricable segments, including randomly selecting at least one first unfabricable segment from the set of unfabricable segments;

changing the value of the selected at least one unfabricable segment to its opposite value to create an updated segmented design;

searching the updated segmented design for the forbidden patterns in the set of forbidden patterns;

in response to determining that the updated segmented design includes at least one forbidden pattern, repeating the adding, selecting, changing, and searching actions; and in response to determining that the updated segmented design does not include any forbidden patterns, generating an indication that the updated segmented design is fabricable.

11. The computer-readable medium of claim 10, wherein adding the segments from the proposed segmented design that appear in the forbidden patterns to the set of unfabricable segments includes, upon finding a given forbidden pattern in the proposed segmented design:

incrementing a forbidden pattern count for each segment associated with the given forbidden pattern.

12. The computer-readable medium of claim 11, wherein selecting the at least one unfabricable segment from the set of unfabricable segments includes:

selecting at least one second unfabricable segment from the set of unfabricable segments based on the forbidden pattern counts.

13. The computer-readable medium of claim 12, wherein selecting the at least one second unfabricable segment from the set of unfabricable segments based on the forbidden pattern counts includes selecting at least one unfabricable segment having a highest forbidden pattern count.

14. The computer-readable medium of claim 11, wherein selecting the at least one first unfabricable segment from the set of unfabricable segments based on the forbidden pattern counts includes performing a weighted random selection, wherein the weights are based on the forbidden pattern counts.

15. The computer-readable medium of claim 14, wherein the weights are a constant raised to a power indicated by the forbidden pattern counts.

16. The computer-readable medium of claim 11, further comprising, for a given forbidden pattern in which the selected at least one unfabricable segment was found, decrementing the forbidden pattern count associated with the given forbidden pattern for each segment in the given forbidden pattern.

17. The computer-readable medium of claim 11, wherein searching the updated segmented design includes:

checking a set of segments that could be part of a forbidden pattern that includes the selected at least one unfabricable segment without checking segments that could not part of a forbidden pattern that includes the selected at least one unfabricable segment; and incrementing or decrementing the forbidden pattern counts for the set of segments based on whether the segments in the set of segments appear in any forbidden patterns of the set of forbidden patterns after changing the material indicated by the at least one unfabricable segment.

18. The computer-readable medium of claim 10, wherein generating the indication that the updated segmented design is fabricable includes providing the segmented design to the fabrication system to manufacture the physical device.

\* \* \* \* \*